United States Patent

Hori et al.

[11] Patent Number: 5,818,407
[45] Date of Patent: Oct. 6, 1998

[54] LIQUID-CRYSTAL DISPLAY DEVICE AND DRIVING METHOD THEREOF

[75] Inventors: Seiichiro Hori; Hiroshi Maeda; Etsuya Takeda; Yoshihiro Gohara, all of Ishikawa, Japan

[73] Assignee: Matsushita Electric Industrial Co., Ltd., Osaka, Japan

[21] Appl. No.: 531,857

[22] Filed: Sep. 21, 1995

[30] Foreign Application Priority Data

Sep. 21, 1994 [JP] Japan .................................. 6-226647

[51] Int. Cl.⁶ .................................................. G09G 3/36
[52] U.S. Cl. .............................................. 345/92; 349/42
[58] Field of Search ................................. 345/92, 93, 87; 349/42, 43, 44, 46, 47, 48, 73, 139

[56] References Cited

U.S. PATENT DOCUMENTS 5,335,102  8/1994  Kanemori et al. ...................... 349/42
5,343,216  8/1994  Katayama et al. ...................... 345/92

FOREIGN PATENT DOCUMENTS 0 466 377  1/1992  European Pat. Off. .
0 588 019  3/1994  European Pat. Off. .
4-75030   3/1992  Japan .
7013191   1/1995  Japan .

*Primary Examiner*—Dennis-Doon Chow
*Attorney, Agent, or Firm*—McDermott, Will & Emery

[57] ABSTRACT

The structure of pixel electrode constituting a pixel element of a liquid-crystal display device employing the capacitively coupling driving method and driving method for the device are described. The field of view angle at the main viewing direction is increased and the grayscale graduation reversal is eliminated through a procedure of sequentially increasing or decreasing, at each scanning busline, the value of compensating potential at a time when a potential being applied to the gate terminal of the switching element shifts from ON potential to OFF potential, to be applied on an adjacent scanning busline to which the storage capacitance is formed, by setting each of the values of storage capacitance ratio and parasitic capacitance ratio different through making each of the values of storage capacitance and parasitic capacitance formed between the plural pixel electrodes and respective switching elements within one pixel element different to each other.

6 Claims, 15 Drawing Sheets

FIG. 3(a)

| A | B | A | B | A | B |
|---|---|---|---|---|---|
| B | A | B | A | B | A |
| A | B | A | B | A | B |

FIG. 3(b)

| A | A | A | A | A | A |
|---|---|---|---|---|---|
| B | B | B | B | B | B |
| A | A | A | A | A | A |

FIG. 3(c)

| A | B | A | B | A | B |
|---|---|---|---|---|---|
| A | B | A | B | A | B |
| A | B | A | B | A | B |

FIG. 3(d)

| A | A | B | A | A | B |
|---|---|---|---|---|---|
| A | B | A | A | B | A |
| B | A | A | B | A | A |

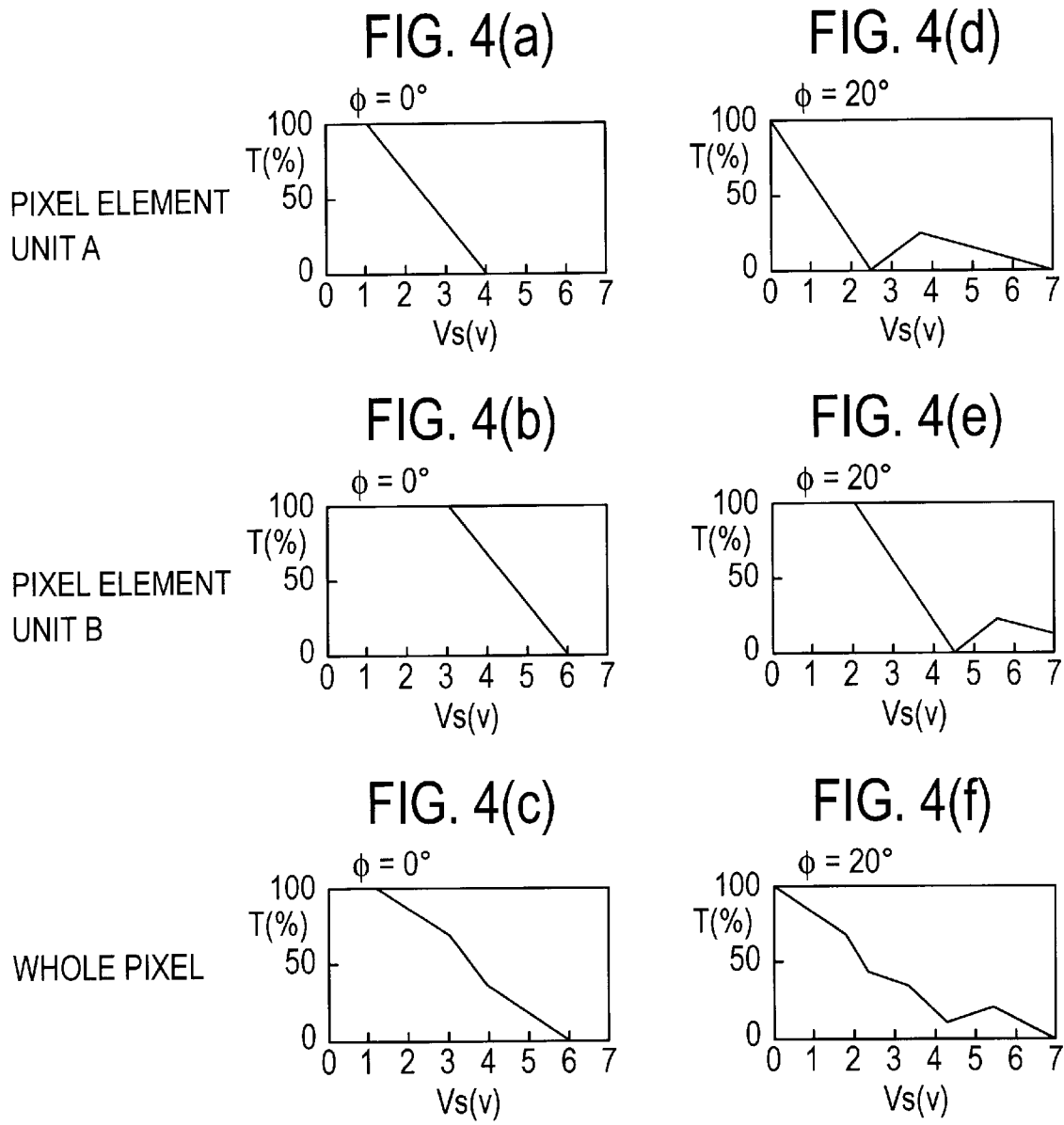

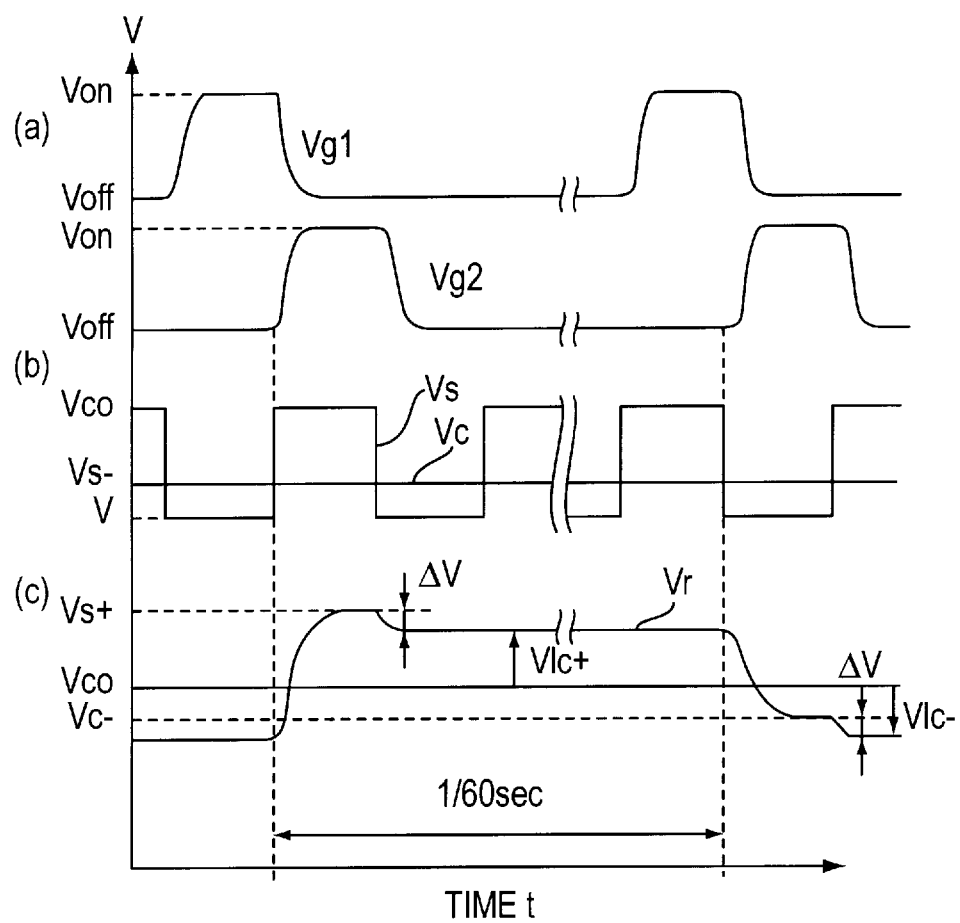

LIQUID-CRYSTAL DISPLAY DEVICE AND DRIVING METHOD THEREOF

FIELD OF THE INVENTION

This invention relates to a liquid-crystal display device used as the display device of a television receiver, a computer, etc., and a driving method.

BACKGROUND OF THE INVENTION

As a means to display letters and images using liquid-crystal panel there has been an active matrix driving method, where each of the display unit is provided with a switching element. A conventional structure of a pixel element according to the active matrix driving method is shown in FIG. 8 and FIG. 9, and the cross section in FIG. 10(a),(b). As shown in FIG. 10, a scanning busline 2 is formed on an insulating substrate 1, and an insulation layer 3 is covering these; on the insulation layer 3 are a switching element 4 consisting of a thin film transistor having gate terminal, source terminal and drain terminal, a data busline 5 crossing the scanning busline 2 and connected with the source terminal of switching element 4, and a pixel electrode 6 connected with the drain terminal of switching element 4. A liquid-crystal layer 7 is disposed in a gap between the insulating substrate 1 on which the switching element 4, pixel electrode 6, etc are formed and a counter substrate 9 on which a counter electrode 8 opposing to the pixel electrode 6 is formed, thus a liquid-crystal display device is constituted. FIG. 11 shows electrically equivalent circuit diagram per one pixel element of this liquid-crystal display device. In the FIG, Cs indicates a storage capacitance between the pixel electrode 6 and the scanning busline 2, Cgd a parasitic capacitance between the drain terminal of switching element and the gate terminal, viz. scanning busline 2, and Cl a pixel element capacitance between the pixel electrode 6 and the counter electrode 8. In order to form a supplementary capacitance Cs, a third busline is sometimes formed in parallel with the scanning busline 2. Vg is a scanning signal applied on the scanning busline 2, Vs a data signal applied on the data busline 5, Vc a common signal applied on the counter electrode 8.

The parasitic capacitance Cgd is defined as follows: As an example, a liquid-crystal material is driven under a driving condition as shown in FIG. 15. In FIG. 15, (a) illustrates scanning signal wave forms Vg1 and Vg2, (b) a data signal wave form Vs and a common wave form Vc, and (c) a common wave form Vc and a pixel element potential wave form Vp. As the scanning signal Vg, a potential to be applied on gate terminal of switching element for turning the switching element ON is named Von, that for turning the switching element OFF is named Voff. The liquid-crystal voltage Vlc is calculated in the formula (1).

$$Vlc = Vp - Vc \qquad (1)$$
$$= Vs - Cgd/(Cs + Cgd + Cl) \times (Von - Voff) - Vc$$

The middle item in the last member of formula (1), $\Delta V$ Cgd/(Cs+Cgd+Cl)×(Von−Voff) represents an element in which a rise and fall of Vg2 makes the display potential Vp change through Cgd. A practical method for measuring the $\Delta V$ is shown in FIG. 16 and FIG. 17. FIG. 16 shows electrically equivalent circuit diagram per one pixel element. In FIG. 17, (a) illustrates scanning signal wave forms Vg1 and Vg2 applied on the scanning busline G1 and G2, (b) a data signal wave form Vs and a common wave form Vc, (c) a common wave form Vc and a pixel element potential Vp. The scanning busline is selected at each 1/60 second, to have the pixel electrode supplied with data signal potentials Vs+ and Vs−. The common wave form potential is named Vc, liquid-crystal voltage at each of the period Vlc+ and Vlc−. When, the liquid-crystal voltages Vlc+ and Vlc− are calculated through formula (2), using formula (1).

$$Vlc+ = Vs+ - \Delta V - Vc$$
$$Vlc- = Vs- - \Delta V - Vc \qquad (2)$$

In the liquid-crystal display device, the display brightness and the liquid-crystal voltage Vlc correspond 1:1. When absolute value of the liquid-crystal voltages Vlc+ and Vlc− differs, it is visually recognized as flicker because the display brightness changes at each 1/60 second. The flicker can be eliminated by adjusting the common potential Vc to make the absolute value of liquid-crystal voltages Vlc+, Vlc− the same. Designating the common potential when flicker disappeared as Vco, the relationship as shown in formula (3) is fulfilled through formula (2).

$$Vlc+ + Vlc- = Vs+ + Vs- - 2\Delta V - 2Vco = 0 \qquad (3)$$

Expanding the formula (3), an element $\Delta V$ in which the rise and fall of Vg2 makes the liquid-crystal voltage Vlc change is calculated in formula (4).

$$\Delta V = Cgd/(Cs + Cgd + Cl) \times (Von - Voff) \qquad (4)$$
$$= (Vs+ + Vs-)/2 - Vco$$

As all the values in the above formula other than the parasitic capacitance Cgd are known, Cgd is calculated in the formula below if $\Delta V$ is measured:

$$Cgd = (Cs+Cl) \times (Vs+ + Vs- - 2 \times Vco)/(2 \times (Von - Voff + Vco) - (Vs+ + Vs-)) \qquad (5)$$

One of the driving methods for the liquid-crystal display device has been made public in Japanese patent Laid-Open Hei2-157815 (hereinafter referred to as capacitively coupling driving method); the time sequential change of signal wave form in the driving method is shown in FIG. 12. As the scanning signal Vg, four potentials namely, a potential Von to be applied to the gate terminal of switching element for turning the switching element ON, a potential Voff for turning the switching element OFF, and compensating potentials Vga, Vgb are used. The compensating potentials Vga and Vgb are applied alternately on each one of the scanning busline or the storage capacitance wire. A data signal potential Vs.and a liquid-crystal voltage Vlc to be applied on a pixel element are calculated from said potentials through the following formulae: (where, the liquid-crystal voltage Vlc higher than common potential Vc is defined as Vlc+, and that lower than common potential Vc is defined as Vlc−, as the polarity of the data signal potential Vs and the compensating potentials Vga,Vgb shifts at every frame.)

$$Vlc+ = Vs - Vc + \{Cs \times (Voff - Vgb) - Cgd \times \qquad (6)$$
$$(Von - Voff)\}/(Cs + Cgd + Cl)$$

$$Vlc- = Vs - Vc - \{Cs \times (Vga - Voff) + Cgd \times \qquad (7)$$
$$(Von - Voff)\}/(Cs + Cgd + Cl)$$

The relationship between the effective value of liquid-crystal voltage Vlc and the light transmission rate T when observed from the direction of normal line to the display panel ($\phi=0°$), and from a direction 20 degrees to the normal line $\phi=20°$) is shown in FIG. 13. Regarding a case when $\phi=20°$, the grayscale graduation reversal occurs when Vlc≧2.5 V. Which means that even at a same liquid-crystal voltage Vlc, the light transmission rate varies depending on the angle of observing a display; or the dependency of field of view angle. The view angle characteristic is shown in FIG. 14.

Thus, in conventional liquid-crystal display devices, the angle of observing a display is restricted because of the large dependency of field of view angle.

SUMMARY OF THE INVENTION

The present invention aims to offer a liquid-crystal display device having an alleviated dependency of field of view angle, and a method of driving the device.

In a display device according to the present invention, the ratio between total capacitance of each pixel electrode(Ct= Cs+Cgd+Cl) and storage capacitance value Cs, and the ratio between the total capacitance and parasitic capacitance value Cgd, viz. the value of storage capacitance ratio Cs/Ct and the value of parasitic capacitance ratio Cgd/Ct are set different in each of plural pixel electrodes formed in a pixel element. The liquid-crystal panel is driven in a manner where the the value of compensating potentials Vga and Vgb, to be applied to the scanning busline on which the storage capacitance Cs is formed, at the time when a potential being applied to the gate terminal of switching element shifts from ON potential to OFF potential, is increased or decreased sequentially at each of the scanning buslines.

Therefore, in a constitution according to the present invention, values of storage capacitance ratio Cs/(Cs+Cgd+ Cl) and parasitic capacitance ratio Cgd/(Cs+Cgd+Cl) are set different between each of the plural pixel electrodes within a pixel element or among adjacent pixel elements.

Hence, as understood from the liquid-crystal voltage Vlc shown in the above mentioned formulae (6) and (7), different liquid-crystal voltages Vlc can be obtained between each of respective pixel electrodes within a pixel element or adjacent pixel elements against a same data signal potential Vs. This eliminates the grayscale graduation reversal and increases the view angle of a liquid-crystal display as a whole. In addition, by sequentially increasing or decreasing the value of compensating potential Vga, Vgb from the top part to the bottom part of a display along with the scanning, said liquid crystal voltage Vlc can be sequentially changed from the top part to the bottom part of the display; this enables to eliminate the dependency of field of view angle by the angle of observing a display.

BRIEF DESCRIPTION OF THE DRAWINGS

FIG. 3(a)–(d) are examples of display structure in the other embodiment of the present invention.

FIG. 4(a)–(f) are characteristic charts showing the relationship between the data signal voltage Vs and the light transmission rate T in accordance with the present invention.

FIG. 17 shows ΔV measuring method.

DESCRIPTION OF PREFERRED EMBODIMENTS

Figure 1:
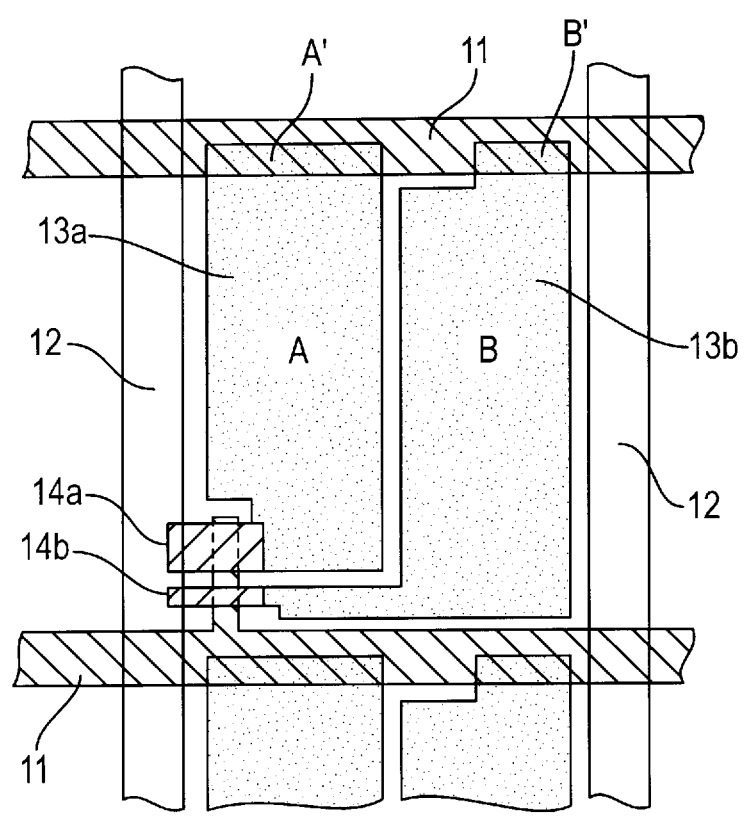
FIG. 1 shows constitution of a pixel element in a liquid-crystal display device according to an embodiment of the present invention.
Figure 10A:
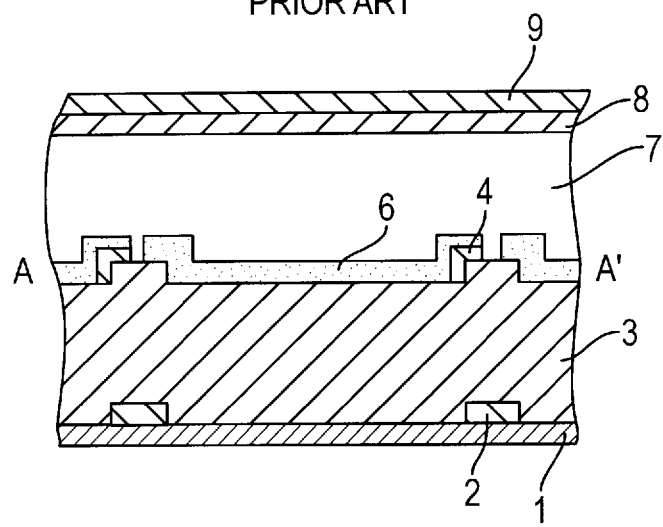
FIG. 10(a),(b) show cross sectional views, sectioned along the A—A' line and the B—B' line in FIG. 8.
Figure 10B:
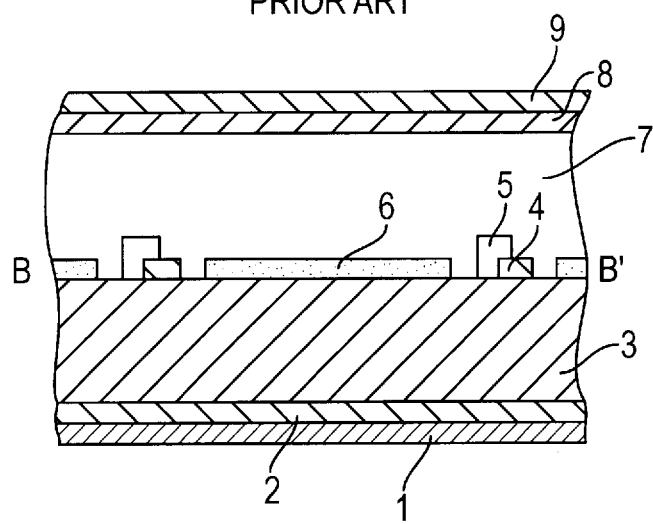
Figure 11:
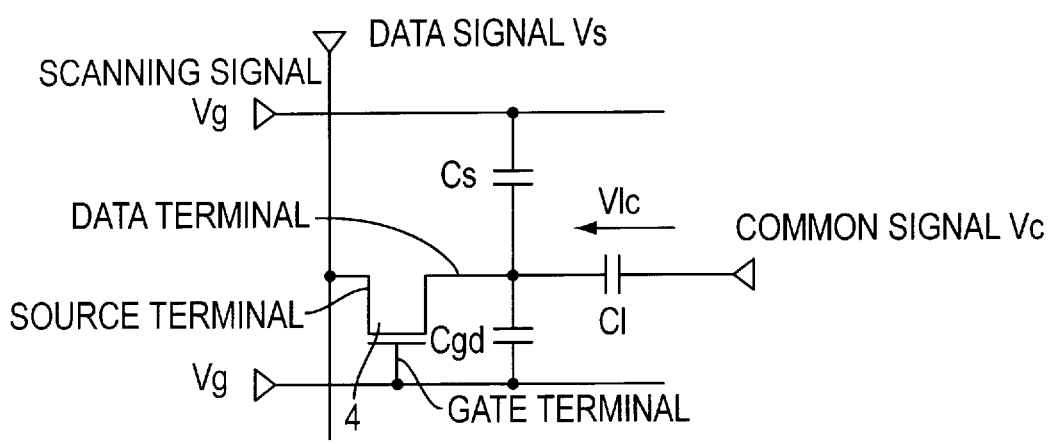
FIG. 11 shows electrically equivalent circuit diagram of one pixel element in a conventional liquid-crystal display device.
Figure 12A:
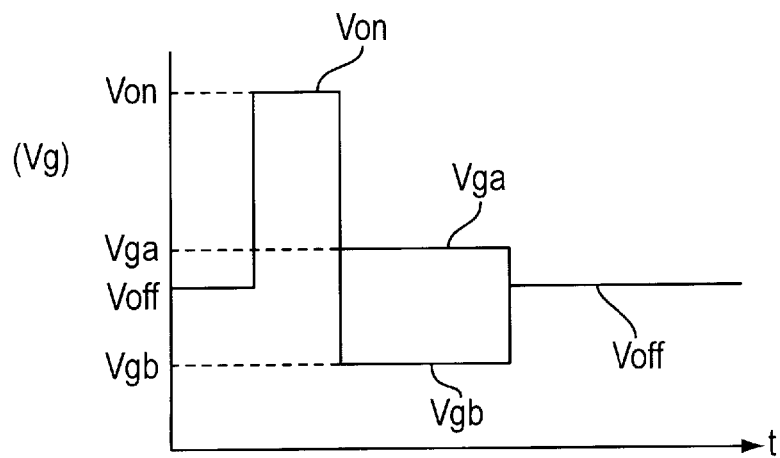
FIG. 12(a),(b) are wave form charts showing the time sequential change of a signal wave form in the capacitively coupling driving method.
Figure 12B:
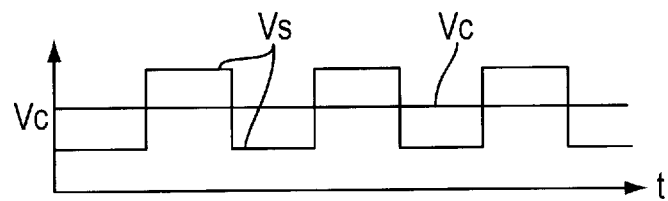
Figure 13:
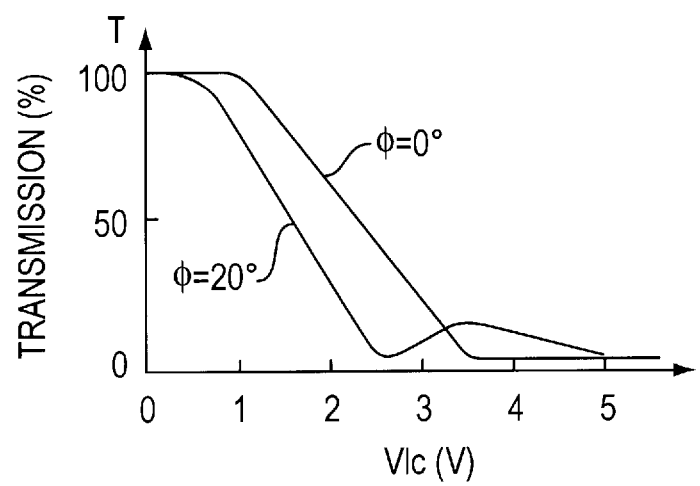
FIG. 13 is characteristic chart showing the relationship between the liquid-crystal voltage Vlc and the light transmission rate T in a conventional liquid-crystal display device.
Figure 14:
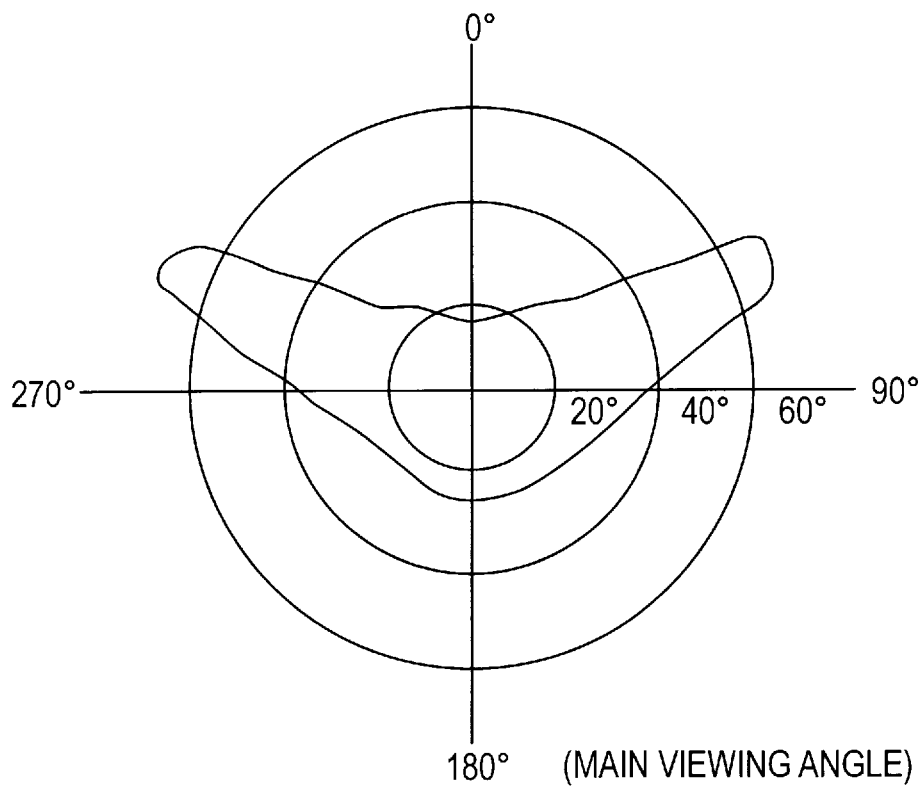
FIG. 14 shows the field of view angle characteristic of a conventional liquid-crystal display device.
Figure 15:
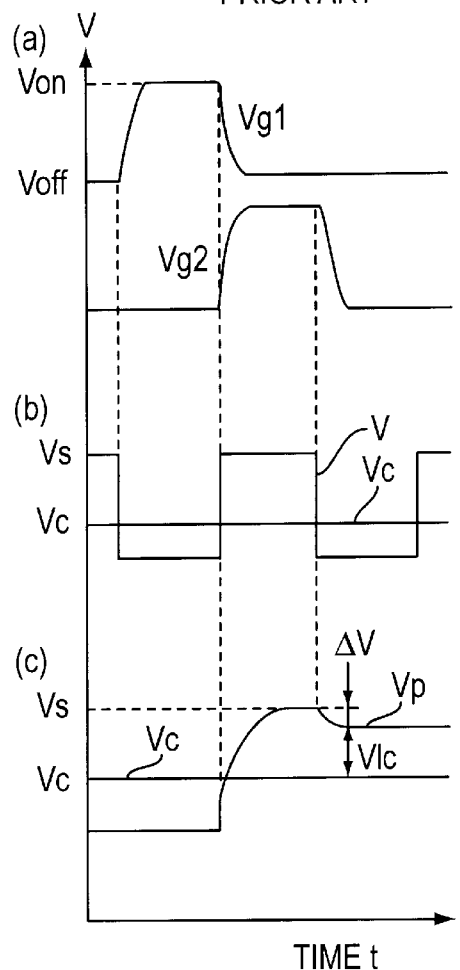
FIG. 15 shows an exemplary driving condition.
Figure 16:
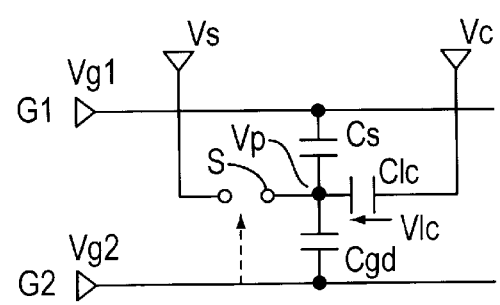
FIG. 16 shows electrically equivalent circuit diagram of one display element.

As an exemplary constitution of a pixel element of a liquid-crystal display device according to the present invention, FIG. 1 shows a constitution of a pixel element wherein a pixel element unit A and a pixel element unit B are provided, as the pixel electrode, in one pixel element. When each of the pixel element unit A and the pixel element unit B is regarded as an entire pixel electrode, their cross sectional views turn out to be the same as the constitution of pixel element in a conventional liquid-crystal display device as shown in FIG. 10, also their electrically equivalent circuit diagrams turn out to be the same as that shown in FIG. 11. The relationship between the data signal potential Vs and the liquid-crystal voltage Vlc is derived also from the above described formula (6) and formula (7), as they are. In FIG. 1, 11 denotes a scanning busline, 12 a data busline, 13a and 13b pixel electrodes, 14a and 14b switching elements consisting of thin film transistors; and the gate terminal, source terminal and drain terminal of which are connected with the scanning busline 11, the data busline 12 and the pixel electrodes 13a and 13b, respectively.

In each of the pixel elements placed in matrix arrangement a plurality(two, in this embodiment) of pixel electrode 13a, 13b and switching element 14a, 14b for switching the pixel electrode 13a, 13b, respectively, are provided. And the gate terminal, source terminal and drain terminal of each of the switching element 14a, 14b are connected with the scanning busline 11, data busline 12 and the pixel electrode 13a, 13b, respectively. Furthermore, a part of each pixel electrode 13a, 13b is overlapped with a part of adjacent scanning busline 11 to produce storage capacitance CsA, CsB, respectively. Thus, liquid-crystal layer 7 held between said pixel electrodes 13a, 13b and a counter electrode 8 is AC driven.

As indicated with A' and B' in FIG. 1, by making the areas of the pixel electrodes 13a and 13b overlapping with the adjacent scanning busline 11 via the insulation layer 3(see FIG. 10) different to each other, the storage capacitance value CsA and CsB are set different to each other. Further, by making the connecting areas of the semiconductor parts of the switching elements 14a and 14b with the pixel electrodes 13a and 13b different to each other, the parasitic capacitance CgdA, CgdB formed between the gate terminal and the drain terminal at each of the switching elements 14a and 14b are set to have different values.

And, among said capacitances CsA, CsB, CgdA, CgdB, and the pixel element capacitances ClA, ClB formed between said pixel electrodes 13a, 13b and the counter electrode 8, each of the storage capacitance ratio CsA/(CsA+CgdA+ClA) and CsB/(CsB+CgdB+ClB) regarding the pixel electrodes 13a, 13b, and the parasitic capacitance ratio CgdA/(CsA+CgdA+ClA) and CgdB/(CsB+CgdB+ClB) are set to have different values.

The light transmission rate T of a liquid-crystal display device corresponds 1:1 to the voltage applied on the liquid-crystal. Therefore, in order to obtain different light transmission rate T under a same driving condition, the liquid-crystal voltage Vlc applied on a liquid-crystal held between the pixel element unit A having the pixel electrode 13a and the counter electrode 8, and that applied on a liquid-crystal held between the pixel element unit B having the pixel electrode 13b and the counter electrode 8 are to be made to have different values under a same driving condition.

When the capacitively coupling driving method is used, in order to prevent the occurrence of flicker in a display as a whole each of the pixel element units needs to fulfill the equation $$Vlc+ = -Vlc-$$

The conditions required to be fulfilled in designing a pixel element meeting the above equation are calculated. In formula (6) and formula (7), a case when Vs=Vc may be considered. Results of the calculation are given below:

$$Cs \times (Voff - Vgb) - Cgd \times (Von - Voff)$$

$$-Cs \times (Vga - Voff) - Cgd \times (Von - Voff) = 0$$

$$Cs \times (2 \times Voff - Vga - Vgb) = Cgd \times 2 \times (Von - Voff)$$

$$Cgd/Cs = (2 \times Voff - Vga - Vgb)/(Von - Voff)$$

According to the above results, in order to prevent the occurrence of flicker, the ratio between the storage capacitance value Cs and the parasitic capacitance value Cgd, Cgd/Cs, should be set, in each pixel element unit, at a certain value decided by the driving condition.

In the following, an example of calculating the values of storage capacitance ratio CsA/(CsA+CgdA+ClA), CsB/(CsB+CsdB+ClB) and the values of parasitic capacitance ratio CgdA/(CsA+CgdA+ClA), CgdB/(CsB+CgdB+ClB) of the pixel element unit A and the pixel element unit B. respectively, under the capacitively coupling driving method is described: (the driving condition and the liquid-crystal voltage Vlc are set as follows: at Vs=Vc=2.5 V; pixel element unit A: Vlc(A)+=−Vlc(A)−=2.5 V, and pixel element unit B: Vlc(B)+=−Vlc(B)=4.5 V Von=10 V, Voff=−10 V, Vga=−6 V, Vgb=−16 V Under the above conditions, the storage capacitance ratios in the pixel element unit A and the pixel element unit B, CsA/(CsA+CgdA+ClA), CsB/(CsB+ CsdB+ClB) and the parasitic capacitance ratios CgdA/(CsA+CgdA+ClA), CgdB/(CsB+CgdB+ClB) are calculated through formula (8) and formula (9).

formula (8) CsA/(CsA+CgdA+ClA)×6−CgdA/(CsA+CgdA+ClA)×
20=2.5CsA/(CsA+CgdA+ClA)×4+CgdA/(CsA+CgdA+ClA)×
20=2.5CsB/(CsB+CsdB+ClB)×6−CgdB/(CsB+CgdB+ClB)×20=
4.5CsB/(CsB+CsdB+ClB)×4−CgdB/(CsB+CgdB+Cl)x=4.5 formula (9) CsA/(CsA+CgdA+ClA)=0.5000CsB/(CsB+CgdB+
ClB)=0.9000CgdA/(CsA+CgdA+ClA)=0.0250CgdB/(CsB+
CgdB+ClB)=0.0450

Figure 5:
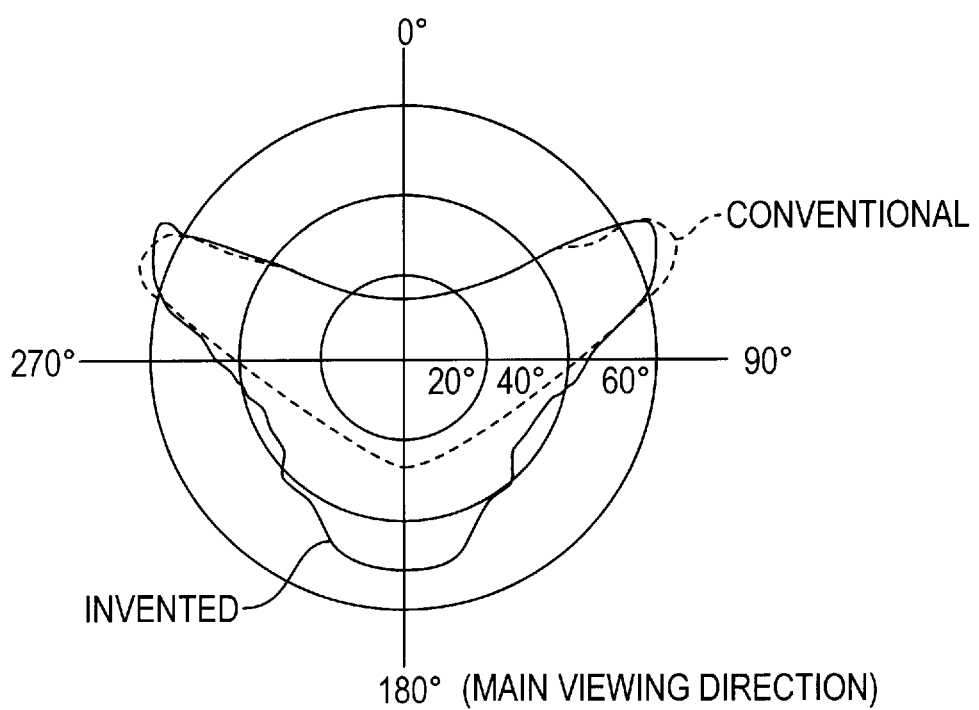
FIG. 5 shows characteristic of the field of view angle in accordance with the present invention.

In a liquid-crystal display device designed in line with these values, the relationship between the pixel element signal potential Vs and the light transmission rate T when Vga is applied as the compensating potential to the scanning busline 11 and Vgb is applied as the compensating potential to the scanning busline 11 as the storage capacitance electrode, is shown with respect to the pixel element unit A, the pixel element unit B and the whole pixel, in FIG. 4(a)–(f). It is seen that the grayscale graduation reversal as observed at each pixel element unit is eliminated as a whole. The field of view angle characteristic is shown in FIG. 5. It is seen that the invented display device has a larger field of view angle as compared with the conventional devices.

Figure 2:
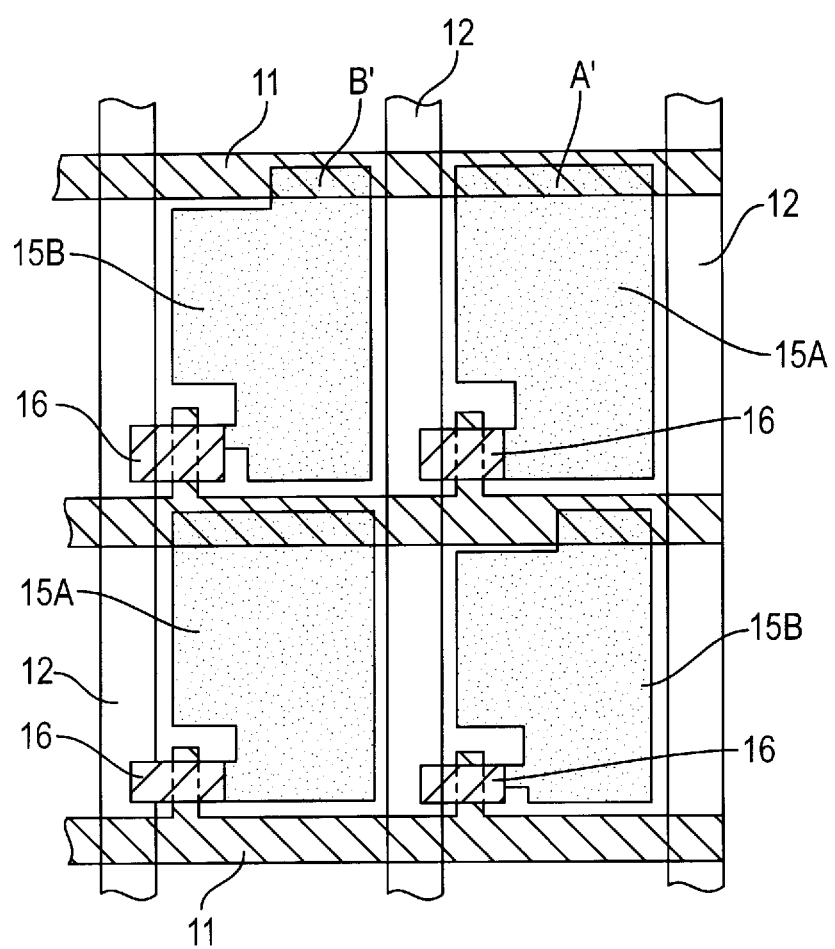
FIG. 2 shows constitution of a pixel element in a liquid-crystal display device according to other embodiment of the present invention.

A second embodiment of the present invention is provided by a method to compose a display by combining pixel element units of two different kinds having a constitution where one pixel element is made of one pixel element unit consisting of one pixel electrode. FIG. 2 shows an exemplary placement of the pixel element units in accordance with the second embodiment. The two different kinds of pixel element units may be arranged with a certain regularity giving different values of the storage capacitance ratio Cs/(Cs+Cgd+Cl) and the parasitic capacitance ratio Cgd/(Cs+Cgd+Cl) to adjacent elements in each of the columns and rows along the scanning busline and the data busline, as shown in FIG. 3(a)–(d). In FIG. 2, 15A is a pixel electrode constituting a pixel element unit A, and 15B is another pixel electrode made of another pixel element unit B; the storage capacitance Cs of each is made different by making the areas A', B' overlapping with the scanning busline 11 via the insulation layer 3 different. The switching element is numbered 16; where the parasitic capacitance Cgd of the switching element 16 is made different between the pixel element unit A and the pixel element unit B, by making the connection areas of semiconductor part of the switching element with the pixel electrode 15 different.

The method of designing a pixel element unit, the voltage-transmission rate characteristic and the grayscale graduation reversal in the above described second embodiment remain the same as those in the first embodiment; the grayscale graduation reversal is eliminated in the display as a whole, and the field of view angle is increased.

In either method according to the first embodiment or the second embodiment, there is no difference in the manufacturing method and in the layer structure as compared with the conventional liquid-crystal display device. This means that it enables to increase the field of view angle only by changing the masks of the photolithography at manufacturing the devices.

Figure 6:
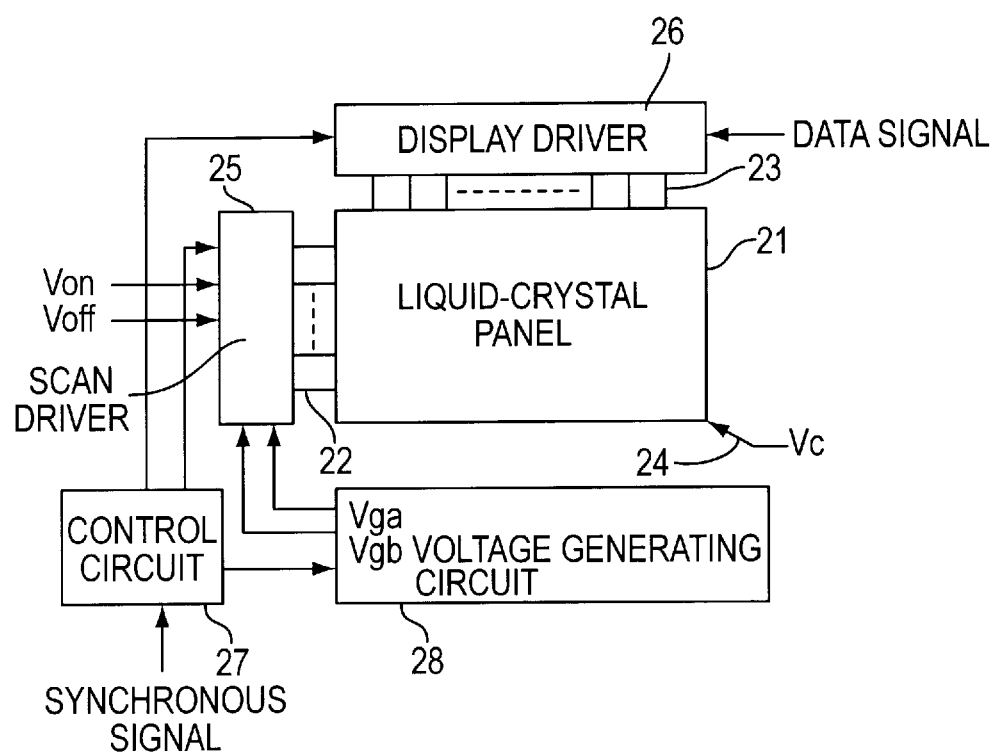
FIG. 6 is block diagram showing a driving circuit in accordance with a driving method for liquid-crystal display device of the present invention.

FIG. 6 shows driving circuit of a liquid-crystal display device accoring to the present invention. In the FIG, numeral 21 denotes a liquid-crystal panel having a pixel element structure as shown in FIG. 1 or FIG. 2, 22 scanning signal leadwires of liquid-crystal panel 21, 23 data signal leadwires of liquid-crystal panel 21, 24 a common electrode leadwire, 25 a scanning driver for applying a scanning signal to the scanning busline, 26 a display driver for applying data signal supplied from the outside to the data busline, 27 a control circuit for controlling the scanning driver 25 and the display driver 26 in accordance with a synchronous signal supplied from the outside, 28 a voltage generating circuit for modifying the potential of the compensating potentials Vga, Vgb which the scanning driver 25 supply, which circuit modifies, synchronized with the operation of the scanning driver 25, the compensating potential and supplies to the scanning driver 25.

The operation of a liquid-crystal display device in accordance with the above described embodiment of the present invention is explained in the following.

Figure 7A:
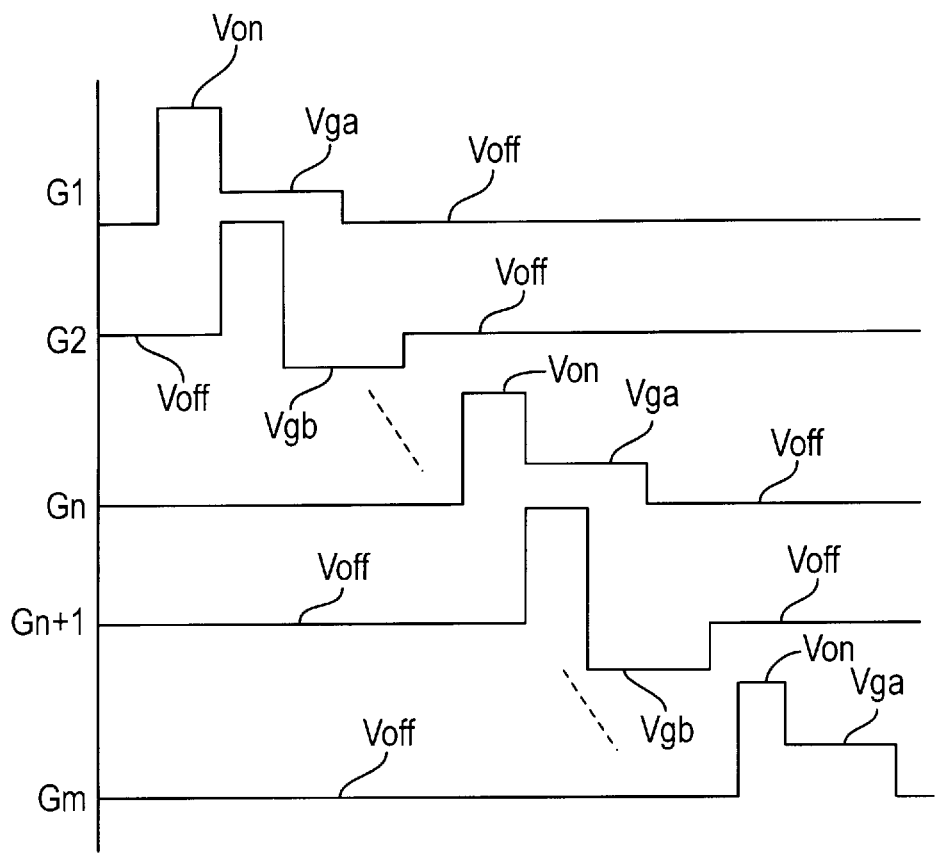
FIG. 7(a),(b) show the driving voltage wave form in a driving method for liquid-crystal display device according to the present invention.
Figure 7B:
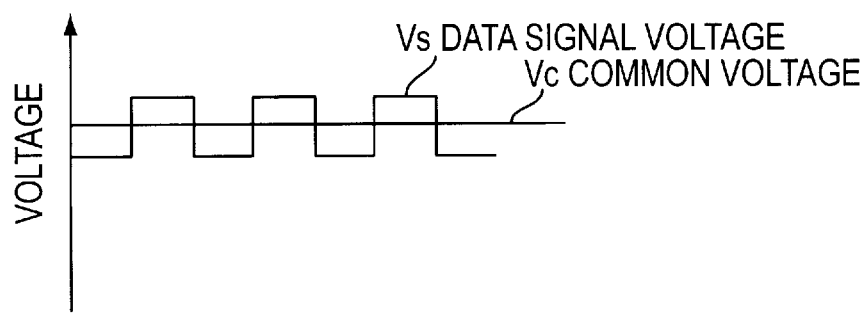
Figure 8:
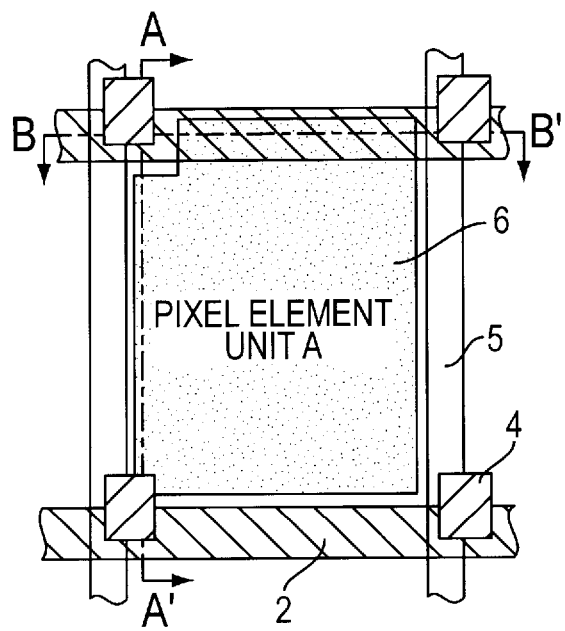
FIG. 8 shows a constitution of a pixel element in a conventional liquid-crystal display device.
Figure 9:
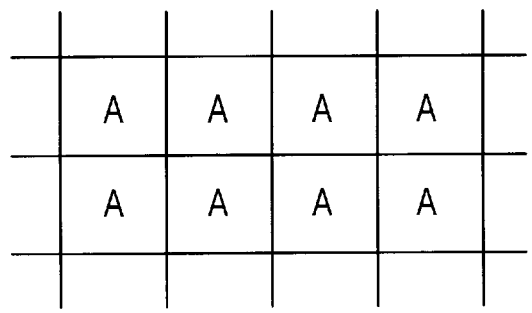
FIG. 9 shows display structure in a conventional liquid-crystal display device.

FIG. 7 is driving wave form chart of a liquid-crystal display device according to the embodiment of the present invention; FIG. 7(a) shows scanning signal potential Vg, FIG. 7(b) data signal potential Vs and common potential Vc.

In FIG. 7(a), Von represents a potential for turning the switching element ON, Voff a potential for turning the switching element OFF. Vga, Vgb are the compensating potential; the compensating potential Vga is applied on the storage capacitance Cs formed between the scanning busline G1 and the pixel electrode or the pixel element electrode, by applying the compensating potential Vga to the scanning busline G1 at a time when the switching element of the scanning busline G2 shifts from ON to OFF. When the scanning signal potential of both scanning buslines G1 and G2 become Voff, the liquid-crystal voltage Vlc of the pixel electrode or the pixel element electrode is decided through the relationship of formula (6) or formula (7). At this time, the storage capacitance Cs and the parasitic capacitance Cgd differ between the pixel electrodes 13a and 13b or the two adjacent pixel electrodes 15A and 15B, therefore different liquid-crystal voltage Vlc is provided between the pixel electrodes 13a and 13b or the pixel electrodes 15A and 15B, and the field of view angle of a display as a whole is increased.

On the other hand, in FIG. 7(a), the compensating potential Vga and Vgb are changed sequentially at each of the scanning buslines. Vga is increased starting from the scanning busline G1 sequentially, and reaches the largest potential at Gm(m is a natural number). Vgb is decreased starting from the scanning busline G2 sequentially, and reaches the lowest potential at Gm−1. Thus, also as seen from the formulae (6) and (7), the liquid-crystal voltage Vlc can be changed sequentially from the top to the bottom of a display; hence, deterioration of the field of view angle characteristic due to the difference in the angle of observing the top and the bottom of a display when seeing an entire display is avoided, and the effect for increasing the field of view angle as a result of introduction of the pixel element structure in accordance with the present invention is significantly enhanced. This structure of pixel element is unable to improve so far as the asymetricity of the field of view angle pertinent to the liquid-crystal panel, therefore the effect becomes remakable when it is combined with a means to improve the field of view angle characteristic that depends on the observation angle.

The structure and arrangement of the pixel element as described in the above mentioned embodiments are of exemplary nature, it is to be understood that such descriptions are not to be limited. Other structures and/or arrangements that enable setting of different storage capacitance ratio and parasitic capacitance ratio values for each of the pixel element units also serve the same purpose. Also, the number of divisions of a pixel element and the combination thereof are not limited to be two kinds, but the objective is attained when they come in a plurality. Although in the embodiment the storage capacitance Cs is formed with one scanning busline before, the storage capacitance may be formed with a third busline for a storage capacitance. Furthermore, the wave form of scanning signal potential described in the embodiment is exemplary, other scanning signal potential wave forms may also be used in so far as the supplementary potential is sequentially changed and applied to.

As described in the aforementioned embodiments, the present invention makes it possible to increase the field of view angle in terms of a whole display through providing different liquid-crystal voltages, by making the storage capacitance and the parasitic capacitance to have different values, with respect to each of the pixel electrodes of adjacent pixel elements or the pixel electrodes divided within a pixel element. In addition, through differentiating the liquid-crystal voltage to be applied to the pixel elements sequentially from the top to the bottom of a display, by improving the scanning signal potential, the dependency of field of view angle due to the angle of observing a display is eliminated, and an easy-to-use liquid-crystal display device having a large field of view angle is implemented. Meanwhile, the arrangement of pixel elements can be improved without necessitating any special process, which means that the manufacturing cost after the improvement is maintained unchanged. The scanning signal potential, too, can easily be improved through a partial modification of a voltage generating circuit, therefore a high-performance liquid-crystal display device can be economically implemented. The effect of the present invention reveals its significance among the larger size displays.

We claim:

1. A liquid-crystal display device comprising a plurality of pixel electrodes in each of pixel elements placed in matrix arrangement and a plurality of switching elements for switching each of said plurality of pixel electrodes, wherein gate terminal, source terminal and drain terminal of said switching element are connected with scanning busline, data busline and pixel electrode, respectively, each of said plurality of pixel electrodes is provided with storage capacitance of different value by overlapping a part of respective electrodes with a part of scanning busline via the insulation layer, liquid-crystal material is held between said pixel electrode and a counter electrode, values of storage capacitance ratio Cs/(Cs+Cgd+Cl) and parasitic capacitance ratio Cgd/(Cs+Cgd+Cl) are set different between each of said plurality of pixel electrodes within a pixel element; where, Cs is storage capacitance value, Cgd is parasitic capacitance value formed between gate terminal and drain terminal of each switching element, Cl is pixel element capacitance value formed between respective pixel electrode and counter electrode.

2. A liquid-crystal display device comprising one pixel electrode and one switching element for switching said pixel electrode in each of pixel elements placed in matrix arrangement, wherein gate terminal, source terminal and drain terminal of said switching element are connected with scanning busline, data busline and pixel electrode, respectively, storage capacitance Cs is formed by overlapping a part of respective electrodes with a part of scanning busline via an insulation layer, liquid-crystal material is held between said pixel element and a counter electrode parasitic capacitance Cgd is formed between gate terminal and drain terminal of the switching element, pixel element capacitance Cl is formed between said pixel electrode and said counter electrode, each of values of storage capacitance ratio Cs/(Cs+Cgd+Cl) and parasitic capacitance ratio Cgd/(Cs+Cgd+Cl) is set different so that the adjacent pixel elements have different values of storage capacitance and parasitic capacitance to each other with a certain regularity in rows or columns of said matrix arrangement by making said storage capacitance of the pixel electrode and the parasitic capacitance of said pixel elements placed in matrix arrangement to have different values alternately between the adjacent rows or columns of said matrix arrangement.

3. A method for driving a liquid-crystal display device comprising a plurality of pixel electrodes in each of pixel elements placed in matrix arrangement and a plurality of switching elements for switching each of said plurality of pixel electrodes, wherein gate terminal, source terminal and drain terminal of said switching element are connected with scanning busline, data busline and pixel electrode, respectively, each of said plurality of pixel electrodes is provided with storage capacitance of different value by overlapping a part of respective electrodes with a part of scanning busline via the insulation layer, liquid-crystal material is held between said pixel electrode and a counter electrode, values of storage capacitance ratio $Cs/(Cs+Cgd+Cl)$ and parasitic capacitance ratio $Cgd/(Cs+Cgd+Cl)$ are set different between each of said plurality of pixel electrodes within a pixel element; where, Cs is storage capacitance value, Cgd is parasitic capacitance value formed between gate terminal and drain terminal of each switching element, Cl is pixel element capacitance value formed between respective pixel electrode and counter electrode, and compensating potential value to be applied on an adjacent scanning busline to which said storage capacitance is formed, at a time when a potential being applied to the gate terminal of said switching element shifts from ON potential to OFF potential, is increased or decreased sequentially at each scanning busline.

4. A method for driving a liquid-crystal display device comprising one pixel electrode and one switching element for switching said pixel electrode in each of pixel elements placed in matrix arrangement, wherein gate terminal, source terminal and drain terminal of said switching element are connected with scanning busline, data busline and pixel electrode, respectively, storage capacitance Cs is formed by overlapping a part of respective electrodes with a part of scanning busline via an insulation layer, liquid-crystal material is held between said pixel element and a counter electrode, parasitic capacitance Cgd is formed between gate terminal and drain terminal of the switching element, pixel element capacitance Cl is formed between said pixel electrode and said counter electrode, each of values of storage capacitance ratio $Cs/(Cs+Cgd+Cl)$ and parasitic capacitance ratio $Cgd/(Cs+Cgd+Cl)$ is set different so that the adjacent pixel elements have different values of storage capacitance and parasitic capacitance to each other with a certain regularity in rows or columns of said matrix arrangement by making said storage capacitance of the pixel electrode and the parasitic capacitance of said pixel elements placed in matrix arrangement to have different values alternately between the adjacent rows or columns of said matrix arrangement, and compensating potential value to be applied on an adjacent scanning busline to which said storage capacitance is formed, at a time when a potential being applied to the gate terminal of said switching element shifts from ON potential to OFF potential, is increased or decreased sequentially at each scanning busline.

5. A liquid-crystal display device according to claim 1 or claim 2, wherein ratio between storage capacitance Cs and parasitic capacitance Cgd, Cgd/Cs, is the same with respect to all of plural pixel element units.

6. A method for driving a liquid-crystal display device according to claim 3 or claim 4, wherein ratio between storage capacitance Cs and parasitic capacitance Cgd, Cgd/Cs, is the same with respect to all of plural pixel element units.

* * * * *